United States Patent
Upmeier

[11] 3,749,540
[45] July 31, 1973

[54] APPARATUS FOR AIR-COOLING A TUBULAR PLASTICS FILM BLOWN BY A BLOWHEAD

[75] Inventor: Hartmut Upmeier, Tecklenburg, Germany

[73] Assignee: Windmoller & Holscher, Lengerich, Germany

[22] Filed: Sept. 29, 1970

[21] Appl. No.: 76,394

[30] Foreign Application Priority Data
Oct. 8, 1969 Germany.................. P 19 50 758.5
Feb. 3, 1970 Germany.................. P 20 04 088.1

[52] U.S. Cl................................. 425/326, 425/72
[51] Int. Cl................................................ B29d 7/02
[58] Field of Search .......... 18/14 S, 19 TM, 12 TT, 18/12 TB, 14 A; 425/326, 72

[56] References Cited
UNITED STATES PATENTS

| | | | |
|---|---|---|---|
| 3,258,516 | 6/1966 | Ewing | 425/327 |
| 3,307,218 | 3/1967 | Reifenhauser | 425/326 X |
| 3,280,429 | 10/1966 | Haley | 425/379 X |
| 3,551,540 | 12/1970 | Pellicciari | 425/66 X |
| 3,445,891 | 5/1969 | Thordarjon | 425/119 |
| 3,346,920 | 10/1967 | Fields | 425/380 X |
| 3,469,282 | 9/1969 | Barnes | 425/371 |
| 3,121,762 | 2/1964 | Harstad | 425/68 X |
| 3,576,051 | 4/1971 | Click | 425/720 |
| 3,596,321 | 8/1971 | Upmeir | 425/172 |
| 3,170,011 | 2/1965 | Cheney | 425/326 X |
| 3,355,770 | 12/1967 | Augustin | 425/326 |
| 3,522,630 | 8/1970 | Swickard | 425/326 X |

Primary Examiner—J. Spencer Overholser
Assistant Examiner—Ben D. Tobor
Attorney—Fleit, Gipple and Jacobson

[57] ABSTRACT

An apparatus for air cooling a tubular plastic film blown by a blowhead to introduce cooling air to within the tubular film at a pressure so that the interior film pressure exceeds the blowing pressure necessary for stretching the film in its plastic state. Mechanical supporting elements of low coefficient of friction externally support the tubular film issuing from the blowhead at least up to a position where the film has solidified.

13 Claims, 8 Drawing Figures

INVENTOR:
Hartmut UPMEIER

BY
Fleit, Gipple & Jacobson
his ATTORNEYS

Patented July 31, 1973  3,749,540

INVENTOR:
Hartmut UPMEIER

BY
Fleit, Gipple & Jacobson
his ATTORNEYS

Patented July 31, 1973 3,749,540

INVENTOR:
Hartmut UPMEIER

BY

Fleit, Gipple + Jacobson his ATTORNEYs

APPARATUS FOR AIR-COOLING A TUBULAR PLASTICS FILM BLOWN BY A BLOWHEAD

The invention relates to an air-cooling apparatus having a high cooling capacity for cooling extruded tubular film, especially thick-walled tubes used in the manufacture of carrier bags, plastics sacks and like products.

For the economical manufacture of tubular plastics film, the take-off speed of the film from the blowhead must be as high as possible and this calls for intensive cooling of the film so as to prevent it from sticking or distorting as would occur if the film temperature is too high. Thus, with tubes of polyethylene film, the temperature must be reduced to below 40° C before the film can be flattened.

To achieve a high degree of cooling it is a prerequisite that the interior of the tubular film should be cooled in addition to its exterior. By reason of the difficulties encountered when conducting a cooling medium through the hot blowhead for the film, interior cooling has so far been effected only by means of water-cooled bulbs or pipe coils but it has been found that films cooled in this way exhibit poor properties, for example inferior weldability, puncture strength and shock-resistance.

The provision of interior air-cooling has so far failed insofar as the increased air throughput that would be necessary for interior cooling cannot be withstood by the low compressive strength of the still plastic tubular film which requires an interior pressure of only 5 to 10 mm of water column to stretch it.

One of our previous patent applications is concerned with a method for air-cooling a tubular plastics film blown by a blowhead, in which an air pipe passing through the blowhead introduces cooling air into the tubular film at such a pressure that the interior air pressure is greater than the blowing pressure that is necessary to stretch the still plastic tubular film which is also subjected to an external stream of cooling air, the pressure of the external cooling air being less than the internal air pressure by an amount corresponding to the pressure required for stretching the tubular film. In this way one first of all obtains the desired higher throughput of internal cooling air. In addition, the difference in pressure between the interior and exterior has a value that is just necessary for producing the desired stretching of the tubular film. The increased external air pressure is achieved according to our aforementioned earlier application by making provision for a pipe or shell which surrounds the still plastic tubular film at a small spacing up to a position where the film has solidified. The resistance to the flow of the cooling air on the exterior of the film between it and the pipe or shell brings about the pressure increase within the pipe or shell.

According to the present invention it is suggested that, whilst retaining the concept of our aforementioned earlier application, an air pipe that passes through the blowhead introduces cooling air to within the tubular film at a pressure so that the interior film pressure exceeds the blowing pressure necessary for stretching the film in its plastic state, an increase in the external air pressure by means of a surrounding pipe or shell is dispensed with and, instead, providing mechanical supporting elements of low coefficient of friction for externally supporting the tubular film issuing from the blowhead at least up to a position where the film has solidified. By means of these mechanical supporting elements, with which the exterior of the film is in direct contact, one prevents the interior air pressure from producing stretching of the film beyond the amount that is desired. Surprisingly, it has been found that, in comparison with the invention of our aforementioned earlier application, there is even a marked improvement in the cooling of the film if the mechanical supporting elements are spaced from one another in such a way that exterior cooling air issuing from a cooling ring provided on the blowhead has substantially unimpeded access to the exterior of the tubular film. However, the apparatus of the present invention also results in excellent uniformity of width because the still plastic tubular film is supported by mechanical means which, once they have been adjusted, no longer require supervision by the operating personnel.

Preferably, the tubular film is supported from the blowhead nozzle up to beyond the solidifying position by a plurality of superposed spaced supporting rings which are adjustable both in their diameter and in respect of their spacing from one another to conform to the desired tubular shape of the film. Whereas by reason of the exterior pipe or shell in the apparatus of our aforementioned earlier application the tubular film could be made only with a predetermined diameter, the apparatus of the present invention permits variations in the film diameter within wide limits.

The low coefficient of friction of the supporting rings relatively to the soft and plastic film may be achieved by providing the rings with easily rotatable sleeves of a heat-resistant non-adhesive material, preferably polytetrafluoroethylene. These sleeves are preferably subdivided into independently rotatable juxtaposed rolls.

The supply pipe for interior cooling air may pass through the blowhead nozzle, diverge along a frustoconical portion and be continued as a cylindrical portion of an enlarged diameter which is slightly smaller than the nozzle diameter, one or more air vents being provided between the pipe and the nozzle. By having an enlarged diameter for the pipe as it approaches the solidifying position of the film one ensures that even after the film has been stretched there will be a comparatively small spacing between the tubular film and the pipe, thereby increasing the air speed and thus the cooling effect along the interior of the film. Since the enlarged diameter of the cylindrical portion is seomwhat smaller than the diameter of the blowhead nozzle, the initially unstretched tubular film when starting the apparatus can still be pulled up.

The blowhead used in conjunction with the apparatus of the invention preferably has a lateral inlet for the molten plastics material from which the film is formed because with such a blowhead there will be no difficulty in introducing the cooling air and leading it off again. Further, an air outlet at the end of the pipe for supplying interior cooling air may be provided with tangentially disposed guide plates, thereby imparting rotary movement to the downwardly flowing air.

Each supporting ring may comprise a plurality of components each of which is formed with a curved portion and straight end portions and is adjustable within limits radially of the tubular film, the radius of curvature of the curved portion corresponding to the radius that the tubular film would receive if the associated component were in a central position between its limits of adjustment, the angle subtended between the straight end portions of each component being 15° to 20° larger than the sector angle of the curved portion. This will ensure that, when setting the components to the largest film diameter to be made, the straight end portions of the components will intersect at an angle of 15° to 20°, thereby giving a polygonal shape to each supporting ring that closely approximates to the desired circular shape for the film. In the setting of the components to the smallest film diameter to be made and even in a central position between their limits of adjustment, the tubular film will be embraced only by the curved portions of the components, the effective supporting line provided by each ring at its minimum setting departing from a truly circular shape to only a small extent which is negligible for present considerations.

There is preferably an even number of components in each supporting ring. Also, it is desirable for all the components of each ring to be simultaneously radially adjustable in the same sense by means of suitable actuating means so that all the supporting elements which in effect govern the film diameter can be set to a different film diameter in a single operation.

Some of the supporting rings preferably together define a substantially cylindrical bounding surface for governing the ultimate radius of the solidified tubular film whilst the other supporting rings are disposed adjacent the blowhead, together define a substantially frustoconical bounding surface for the film and are adjustable in unison by means of a parallelogram linkage which ensures that when the rings defining the cylindrical bounding surface are adjusted the other rings defining the frustoconical bounding surface are correspondingly adjusted.

The supporting elements may comprise wires having the aforementioned easily rotatable heat-resistant covering. In this case the supporting elements may be slightly inclined to one side of a radial plane of the tubular film. If a take-off device for the solidified film is continuously rotated in only one direction (such rotation being provided to spread out any errors in film thickness that might otherwise result in undesirable bulges when the film is coiled), then such inclination of the supporting elements will cause the film to move in a slightly helical path whilst it is disposed in the region of the mechanical supporting elements. If the take-off device is not rotated at all, the slight lateral inclination of the individual supporting rings exerts a twisting effect on the film in its longitudinal direction and this is of advantage in some cases.

Above the solidifying position of the tubular film, i.e., at a position where there is no longer a danger of the film sticking, there may be further supporting elements which are hollow for the passage of a cooling medium and which bring about further cooling of the film.

Examples of the invention are illustrated in the accompanying diagrammatic drawings, in which.

Figure 1:
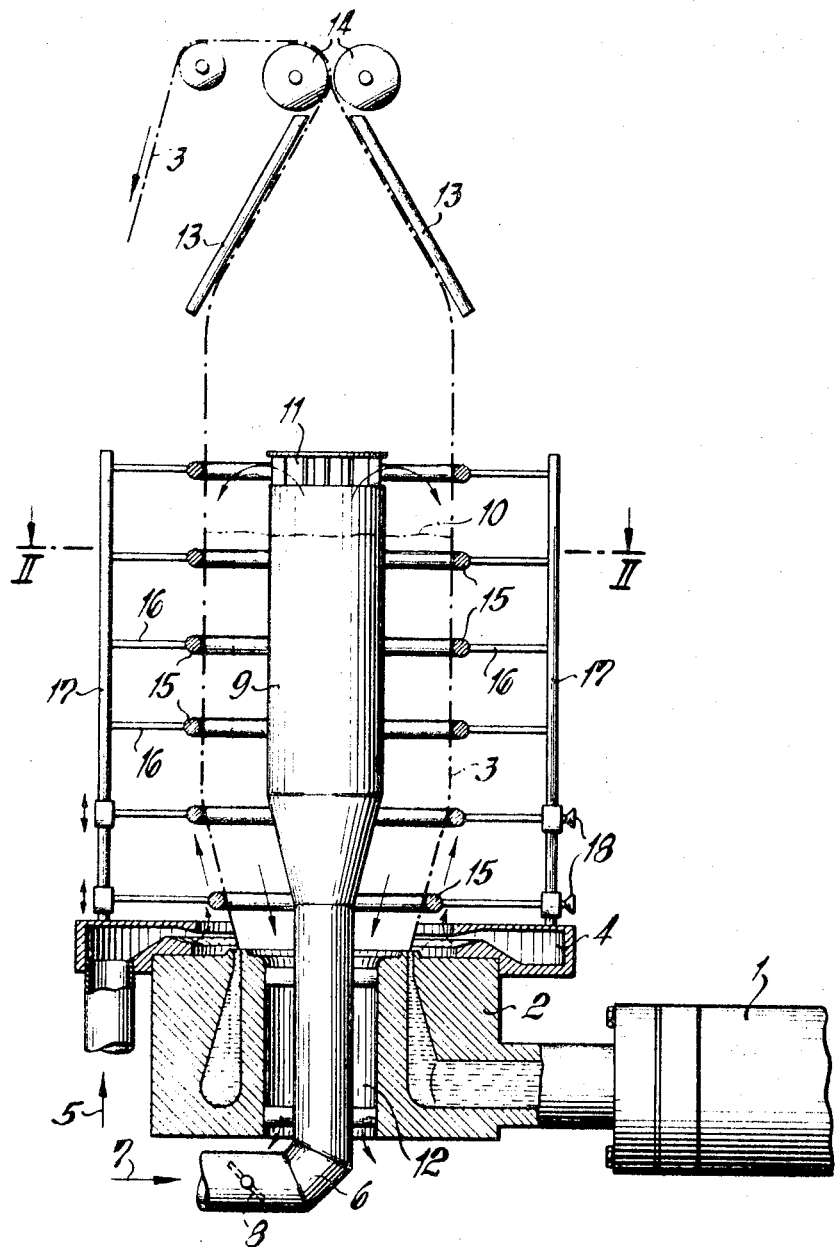
FIG. 1 is a sectional side elevation of an air-cooling apparatus.

Referring to FIG. 1, fluent thermoplastic material leaving an extruder 1 is delivered to a blowhead 2 and formed into a tubular film 3. At the exterior, the film is cooled by means of a cooling ring 4 to which cooling air is supplied in the direction of the arrow 5. The interior of the tubular film is cooled by air which, as indicated by the arrow 7, enters a supply pipe 6 which passes concentrically through the blowhead and into the tubular film. The interior and exterior cooling air is preferably delivered by a common fan (not shown), a throttle plate 8 permitting the degree of inflation of the film 3 to be accurately set. The interior cooling air passes through the pipe 6 into a pipe portion 9 which is of enlarged diameter and extends to beyond a level 10 where the film has solidified. At the outlet from the pipe portion 9, the air escapes through slots 11 and passes downwardly between the pipe and the film 3, through an annular passage 12 to atmosphere.

Figure 8:
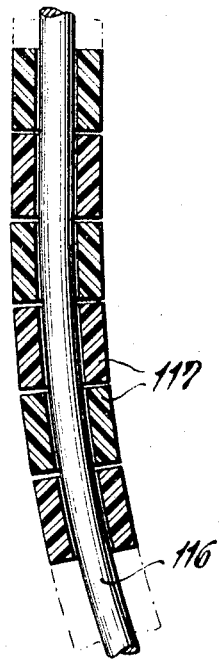
FIG. 8 is a fragmentary section corresponding to FIG. 7 but illustrating a different form of supporting ring.

Whilst the tubular film is still in plastic state between the blowhead nozzle and at least up to the solidified position 10, the film is surrounded and supported by supporting rings 15 which have a low coefficient of friction with respect to the hot film. By means of the supporting rings the pressure within the inflated film can be considerably higher than the blowing pressure that is necessary to stretch the film during inflation. The individual supporting rings 15 are connected by holders 16 to a frame 17, the holders 16 being slender so that they will exert little resistance to the external current of cooling air. As shown in FIG. 8, the supporting rings may comprise separate closely juxtaposed and freely rotatable rolls which may be of polytetrafluoroethylene and thus there will only be rolling friction between the plastic film and the supporting rings, such rolling friction being particularly low if the roll material has a low coefficient of friction.

The cooled film 3 is flattened by flattening plates 13, squeezed and taken off by a pair of squeeze rolls 14 and subsequently reeled by a winder (not shown). Further cooling means for cooling the film from the solidifying temperature to a temperature at which it is safe to flatten it are not illustrated.

Figure 2:
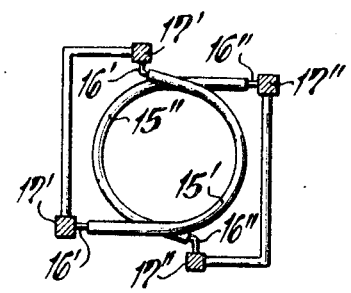
FIGS. 2 and 3 are sections on the line II—II in FIG. 1 showing an adjustable supporting ring in respectively different positions of adjustment.
Figure 3:
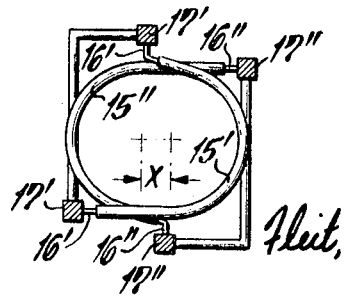

FIGS. 2 and 3 show one way for radially adjusting the supporting rings 15. Each ring comprises substantially semi-circular components 15' and 15" and by displacing these components as well as their holders 16' and 16" and 17' and 17" through a distance X the rings can be set to different film diameters. It is particularly advantageous if, in addition to the radial adjustment of the supporting rings 15, those of the rings disposed along a frustoconical portion of the film immediately upstream of the blowhead nozzle are also axially displaceable, as diagrammatically indicated by the clamps 18. In this way the supporting rings can be accurately set to the desired film shape.

A surprising increase in the cooling effect can be observed relatively to the construction described in our aforementioned earlier application. This is because the spacings, which are preferably 150 to 200 mm, between the supporting rings permit unhindered access of cooling air to the exterior of the tubular film, any consequent decrease in the air speed and heat transference that would be obtainable if the film were surrounded by a closed shell being more than compensated in the present construction where cool air from the room is carried along by the stream inssuing from the cooling ring 4 to sweep along the film.

Figure 4:
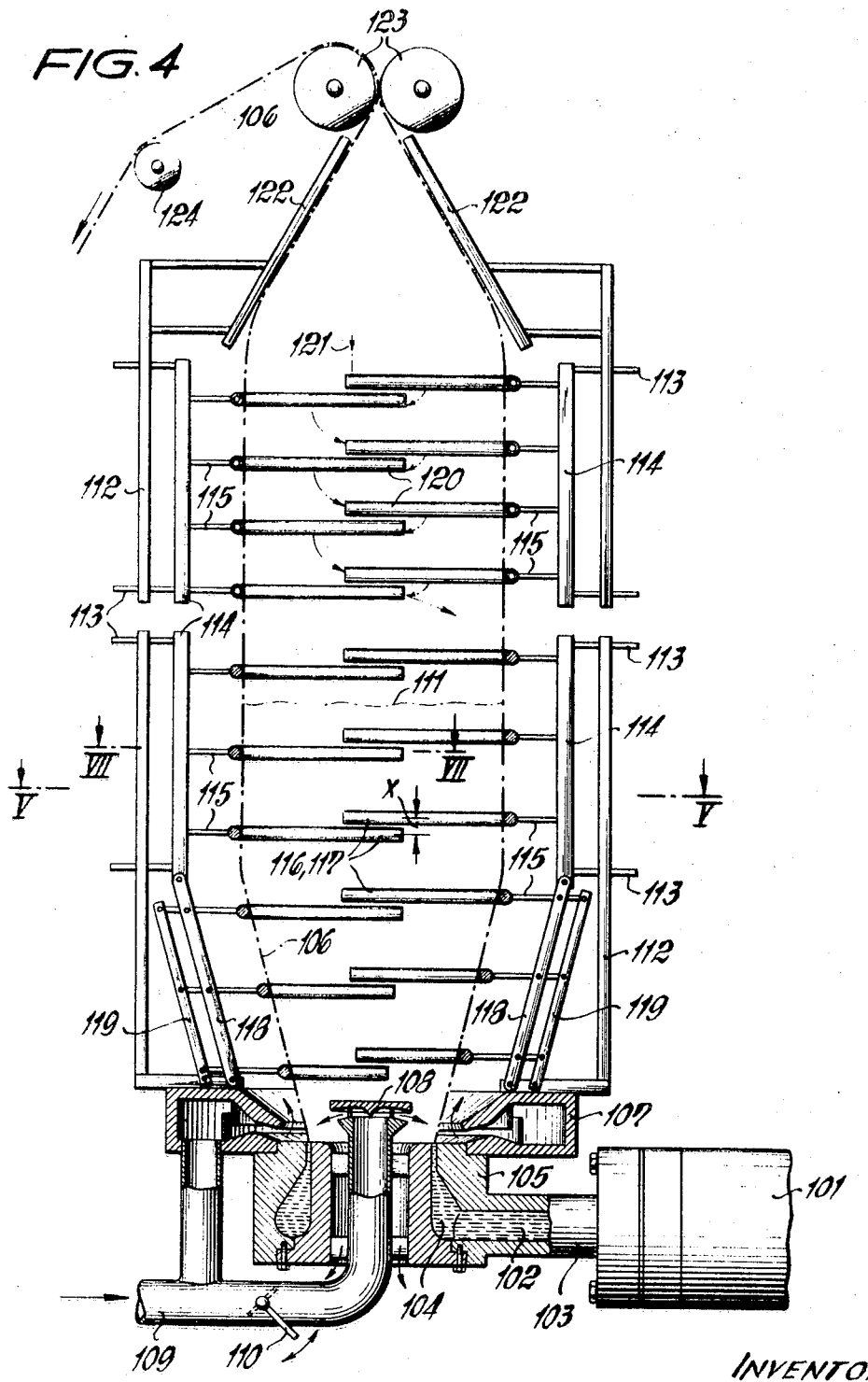
FIG. 4 is a longitudinal section through a different and preferred embodiment of air-cooling apparatus.

In the preferred embodiment of FIG. 4, the extruder is shown at 101, a supply passage for the plastics material leading to a distributing passage 104 is shown at 103 and the blowhead at 105. The tubular film 106 formed by the blowhead is fed with cooling air by an outer cooling ring 107 and an inner cooling ring 108, the cooling air being supplied through a branched supply pipe 109 which contains a throttle plate 110 for controlling inflation of the film 106.

To support and govern the diameter of the still plastic film 106 at least to above a position 111 where the film is solidified, supporting elements having a rotary covering 117 are carried by holders 115 carried by bars 114 which, in turn, are carried by displaceable holders 113 supported by a frame 112 on the cooling ring 107. The individual components of each supporting ring are superposed at a centre line spacing of $x$ which is a little larger than the thickness of the components. Since the internal air pressure is larger than that necessary for stretching the film to tubular form, it is desirable also to support the frustoconical transition of the film between the blowhead and the cylindrical portion of full diameter. For this purpose the supporting rings in this region are continuously adjustable in diameter to conform to the conical film shape in that their holders 115 are rotatably mounted in the levers 118, 119 of a parallelogram linkage, one end of the levers 118 and/or 119 being pivoted to the lower end of the bars 114 so that when the latter are adjusted the frustoconical shape of the film is automatically changed through the levers 118, 119.

Still further supporting elements 120 are provided for the film after it has solidified. These are similar to the supporting elements 116, 117 except that they are hollow so that a cooling medium can be passed directly through them as indicated by the arrows 121. Downstream of the further supporting elements the film is flattened by flattening plates 122, squeezed and taken off by a pair of rolls 123 and fed to direction-changing rolls 124 of a film winder (not shown).

Figure 5:
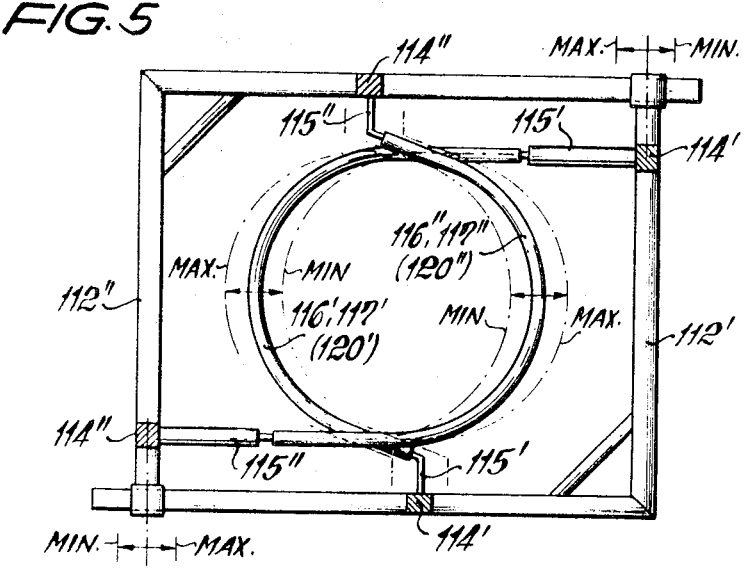
FIG. 5 is a simplified cross-section on the line III—III in FIG. 4.
Figure 6:
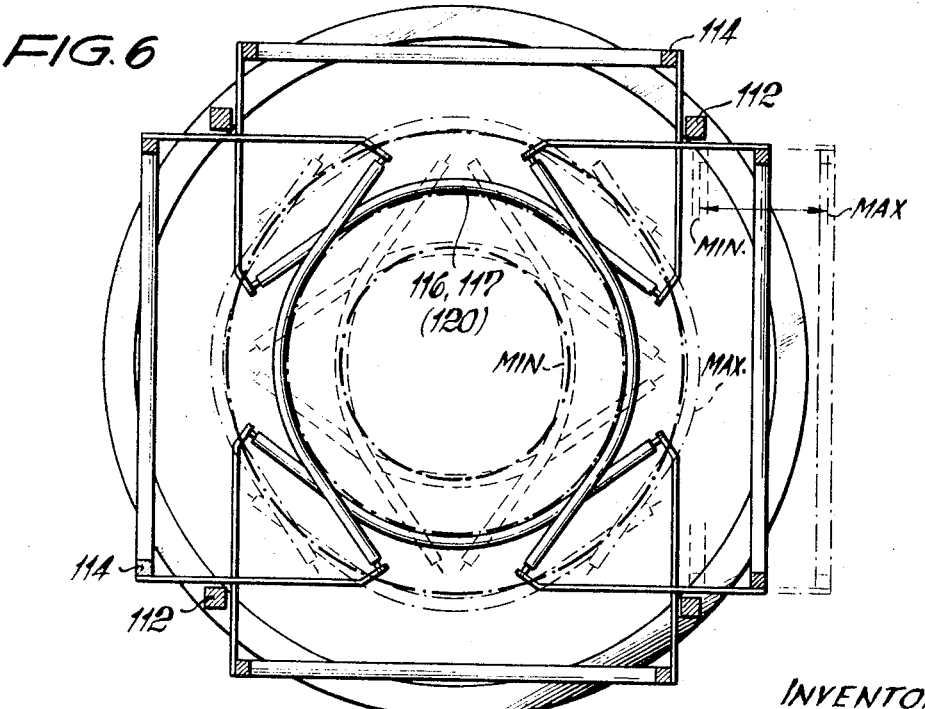
FIG. 6 is a view similar to FIG. 5 but showing a modification in which each supporting ring comprises four components.

A supporting ring construction which permits a greater range of adjustment than that shown in FIGS. 2 and 3 is illustrated in FIG. 5 where each ring comprises two components and has an adjustment range of about ±10 percent and in FIG. 6 where each supporting ring comprises four components and the range of adjustment is about ±50 percent. A larger but even number of components for each supporting ring, e.g. six, eight or ten, would give a yet larger range of adjustment but the expense would likewise be higher. Each component comprises a curved portion which has a radius of curvature equal to the film radius that would result from the components being at the middle of their range of adjustment, each curved portion terminates in straight portions which subtend an angle between one another that is preferably 15° to 20° larger than the sector angle of the tubular film. In this way the straight portions will intersect at 15° to 20° when the components are set for the widest film diameter, this resulting in a polygonal shape for each supporting ring that closely approximates to a circle. This is not so much applicable to the FIG. 5 construction (where each supporting ring defines a figure having two angles and two convex sides when the components are at the minimum setting and an oval when the components are at the maximum setting) as it is to the FIG. 6 construction where there are four components for each supporting ring. In FIG. 6, the position of the components shown in broken lines indicates the minimum setting where they define a figure having four angles and four convex sides. Their maximum setting is shown in chain-dotted lines where they define a figure which is almost circular. The ideal circle for each setting is indicated in heavy chain-dotted lines.

To simplify the drawings, the adjusting means for the simultaneously adjustable supporting elements have not been illustrated. They may be actuated by gears and racks, sprockets or even ropes or belts. Further, the drawings do not show that the diameters of the supporting rings located in the zone where the film is still plastic preferably increases slightly in the direction of film travel so as to avoid the formation of longitudinal folds in the film. Still further, the drawings do not show that in the region of the further supporting elements represented by the pipes 120 in FIG. 4 the diameters progressively decrease slightly so as to allow for shrinkage of the film during cooling.

The take-off device for the film as represented by the flattening plates and squeeze rolls is preferably rotated relatively to the blowhead to distribute any errors in film thickness over the entire width of the film. The supporting elements and the frame in which they are mounted can in this case be rotated together with the take-off device, this being particularly desirable if the direction of rotation of the take-off device is alternated every, say, 360°. If the take-off device is rotated in only one direction, the individual supporting rings are preferably slightly inclined to one and the same side of a radial plane of the tubular film so that the film will pass through the supporting rings along a slightly helical path. If the take-off device is not rotated at all then the slight lateral inclination of the supporting rings will cause a twisting effect to be exerted on the tubular film in the longitudinal direction and this is advantageous in certain cases.

Figure 7:
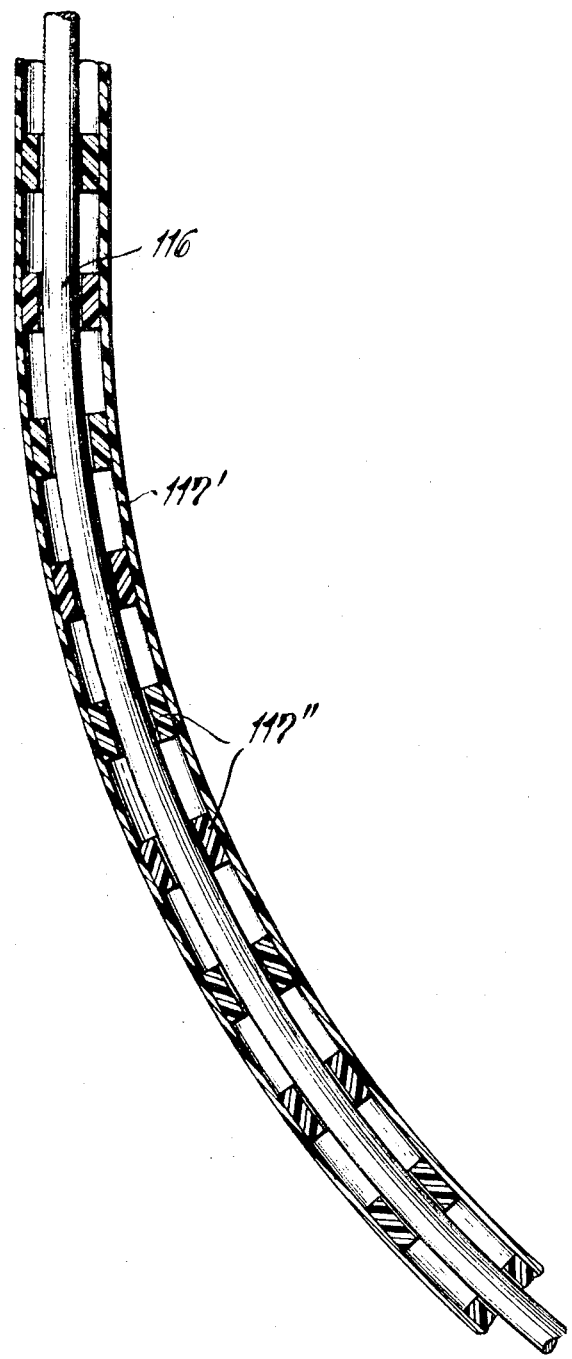
FIG. 7 is a fragmentary section on the line IV—IV in FIG. 4.

FIGS. 7 and 8 show two forms of rotatable covering for the wires 116 of the supporting elements. The covering preferably comprises individual supporting rolls 117 of polytetrafluoroethylene (FIG. 8) or can be formed by a flexible tube 117' (FIG. 7) which may be of silicon rubber and rotatable together with the individual rolls 117".

I claim:

1. Apparatus for air-cooling a tubular plastics film blown by a blowhead, comprising an inlet and an outlet passageway passing through the blowhead to maintain a throughput of cooling air within the tubular film at a pressure that exceeds the pressure necessary for stretching the film in its plastic state, and a plurality of superposed spaced supporting rings of low coefficient of friction for externally supporting the tubular film issuing from the blowhead at least up to a position where the film has solidified, each of said supporting rings comprising a plurality of components each of which is formed with a curved portion and straight end portions and is adjustable within limits radially of the tubular film, the radius of curvature of the curved portion corresponding to the radius that the tubular film would receive if the associated component were in a middle position between its limits of adjustment, and wherein the angle subtended between the straight end portions of each component is 15° to 20° larger than the sector angle of the curved portion.

2. Apparatus according to claim 1, wherein the superposed supporting rings are spaced from one another in such a way that exterior cooling air issuing from a cooling ring provided on the blowhead has substantially unimpeded access to the exterior of the tubular film.

3. Apparatus according to claim 1, wherein the tubular film is supported from the blowhead nozzle up to beyond the solidifying position by the said plurality of superposed spaced supporting rings which are adjustable both in their diameter and in respect of their spacing from one another to conform to the desired tubular shape of the film.

4. Apparatus according to claim 1, wherein said supporting rings are provided with easily rotatable sleeves of a heat-resistant non-adhesive material such as polytetrafluoroethylene.

5. Apparatus according to claim 4, wherein the sleeves comprise independently rotatable juxtaposed rolls.

6. Apparatus according claim 1 in combination with a blowhead having a lateral inlet for molten plastics material from which the film is formed.

7. Apparatus according to claim 1, wherein each supporting ring comprises an even number of said components.

8. Apparatus according to claim 1, wherein the components of each supporting ring are simultaneously radially adjustable in the same sense.

9. Apparatus according to claim 1, wherein some of the supporting rings together define a substantially cylindrical bounding surface for governing the ultimate radius of the solidified tubular film and the other supporting rings are disposed adjacent the blowhead, together define a substantially frustoconical bounding surface for the film and are adjustable in unison by means of a parallelogram linkage.

10. Apparatus according to any one of claims 1, wherein the supporting rings comprise wires having an easily rotatable covering.

11. Apparatus according to claim 1, including further supporting rings beyond the solidifying position, said further rings being hollow for the passage of a cooling medium.

12. Apparatus according to claim 1, wherein the supporting rings are carried by a frame which is continuously or reversingly rotatable about the longitudinal axis of the tubular film.

13. Apparatus according to claim 1, wherein the supporting rings are slightly inclined to one side of a radial plane of the tubular film.

* * * * *